Aug. 4, 1970 R. CHIKLI-PARIENTE 3,523,252

TRANSFER-STORAGE STAGES FOR SHIFT REGISTERS AND LIKE ARRANGEMENTS

Filed Nov. 22, 1967 2 Sheets-Sheet 1

Inventor:
Robert Chikli-Pariente
BY Baldwin Wight Diller & Brown
Attorneys

Inventor:
Robert Chikli-Pariente
BY Baldwin Wight Diller & Brown
Attorneys

United States Patent Office 3,523,252

Patented Aug. 4, 1970

3,523,252

TRANSFER-STORAGE STAGES FOR SHIFT REGISTERS AND LIKE ARRANGEMENTS

Robert Chikli-Pariente, Paris, France, assignor to Societe Industrielle Bull-General Electric (Societe Anonyme), Paris, France Filed Nov. 22, 1967, Ser. No. 685,119
Claims priority, application France, Apr. 26, 1967, 104,236
Int. Cl. G11c *19/00;* H03k *21/30*
U.S. Cl. 328—37 6 Claims

ABSTRACT OF THE DISCLOSURE

A signal transfer and storage element, which may be used to constitute various circuit arrangements, such as shift registers, pulse counters or the like, comprises a dual gate section connected between output terminals of a "transfer" flip-flop and input terminal of a "storage" flip-flop, these flip-flops being formed in cross-coupled logical amplifiers. Depending upon the signals which are applied to control input terminals of the gate section, the element may operate either according to the single-pulse per cycle mode or according to the two-pulse per cycle mode of operation.

This invention relates to logical circuit arrangements such as shift registers, pulse counters, progressers, etc., employed in the data or information processing or transmission field. More precisely, the invention relates to improvements in elements employed in the construction of such a circuit arrangement. Since such an element serves to perform the transfer and the storage of an elementary binary datum, it will hereinafter be referred to as the transfer-storage stage.

The invention finds its application essentially, but not exclusively, in the field of modern, very rapidly operating elements designed in the form of modules comprising integrated semiconductor circuits. With the latter, even if the number of parts performing the function of a transistor is increased, this does not substantially influence the cost of production of a module.

It is known that it is extremely desirable in practice for an integrated element to be as universal as possible because, in a data processing installation, the reduction of the number of "standards" is a factor of economy and simplicity of use.

One of the objects of the invention is to provide a transfer-storage which is entirely universal, that is to say, may be employed to form a logical arrangement, either of the synchronous type or of the asynchronous type, assuming the "single-phase" mode of operation, i.e. that employing a single shift pulse, or the so-called "two-phase" mode of operation, i.e. that employing two successive shift pulses, in which the introduction of the binary data may be effected either by short pulses or by appropriate voltage levels.

Another object of the invention is to provide a transfer-storage stage which operates very reliably, notably in the event of excessive levels of a polarity opposite to that of the voltage level adopted to represent the logical value "1," for example.

Up to the present, no transfer-storage stage hitherto known has enjoyed a sufficient degree of universality. Some types of stages have been adapted only to the "single-phase" mode of operation, notably those including a time delay member.

There is also known a transfer-storage stage adapted only to the "single-phase" mode of operation, but having no delay member, which is composed of a transfer section and of a storage section, each section comprising a bistable flip-flop circuit composed of two cross-coupled logical inverter circuits. Such an element has been disclosed in U.S. Pat. No. 3,083,305 granted Mar. 26, 1963.

In order to make such a transfer-storage stage as universal as possible, without its suffering from the disadvantages inherent in previously known elements, the measures proposed in accordance with the invention consist in adapting the transfer section to its new mode of operation, inserting a gate section between the transfer section and the storage section, and controlling this gate section in an appropriate manner.

Accordingly, in accordance with the invention, in a binary signal transfer-storage stage, of the type comprising a transfer section having one binary signal input terminal and one storage section having at least one binary signal output, each of these sections being composed of a bistable flip-flop circuit and these sections being interconnected and operating under the control of a train of recurrent signals, there are provided a first logical gate and a second logical gate each of which consists of a logical inverting circuit having a number of inputs and at least one output, a first input and a first output of these gates being connected to effect the transfer of the state of the transfer flip-flop to the storage flip-flop, another input of each of the two gates receiving a first systematically applied pulsed signal, and a third input of each of the two gates being provided to receive either a predetermined constant voltage level or a second pulsed signal applied after the first pulsed signal.

It is to be noted that, regardless of the mode of operation adopted, the two gates each have the object of transmitting a particular binary value "1" and "0" respectively, from the transfer flip-flop, also called the buffer flip-flop, to the storage flip-flop, also called the memory flip-flop.

Further features and advantages of the invention, and its application, will be more clearly apparent from the following detailed description, with reference to the accompanying drawings, in which.

Figure 1:
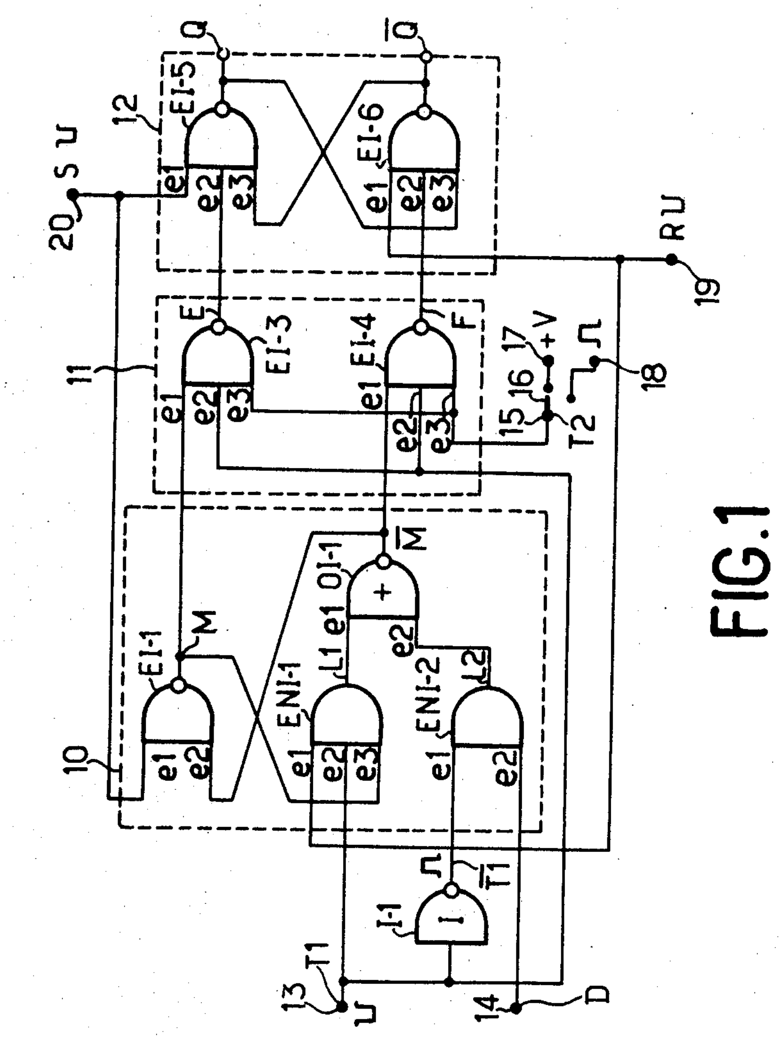
FIG. 1 shows the logical diagram of the transfer-storage stage according to the invention.

FIG. 1 illustrates in the form of a logical circuit a transfer-storage stage conforming to the teaching of the present invention. This stage is composed essentially of a bistable transfer circuit 10, as called a "buffer flip-flop," of a gate section 11 and of a bistable storage circuit 12, also called "storage flip-flop." In the drawing, these elements are each bounded by a chain-lined rectangle.

The bistable flip-flop circuits being well known, it is sufficient to recall that each of the two cross-coupled amplifiers of which they are composed may be a logical inverting circuit, a number of models of which exist.

Thus, the storage flip-flop 12 is composed of two logical inverting circuits EI–5 and EI–6. Each of these circuits is symbolically represented as having three inputs *e1*, *e2*, and *e3*, and one output Q or $\overline{Q}$. One input, for example *e3*, of each of these logical circuits is connected to the output of the other.

The symbolical representation adopted for EI–5 and EI–6 is that of a NAND circuit, i.e. an element performing the functions of intersection and inversion. It will hereinafter be explained why this designation has no absolute or restrictive character, because it is given above all to distinguish the various types of logical circuits employed, and taking account of the fact that it is a positive voltage level which is chosen to represent the binary "1."

The buffer flip-flop 10 has a slightly different construction from the storage flip-flop 12. Its first half comprises a NAND circuit EI–1 having only two inputs *e*1 and *e*2. Its second half is composed of two non-inverting AND circuits. ENI–1 and ENI–2, and of a NOR circuit OI–1. The output $\overline{M}$ of OI–1 is connected to an input, for example *e*2, of the NAND circuit EI–1, and the output M of the latter is connected to one of the three inputs, for example *e*3, of the AND circuit ENI–1. The NOR circuit OI–1 has only two inputs, the first *e*1 being connected to the intermediate output L1 of ENI–1 and the second *e*2 being connected to the intermediate output L2 of ENI–2.

The input *e*2 of ENI–1 is connected to an input terminal 13 to which there may be applied negative-going pulses T1, these pulses being referred to either as timing pulses or as shift pulses. An inverting circuit I–1 is inserted between the input terminal 13 and the input *e*1 of ENI–2, so that, at each negative pulse T1, the said input *e*1 receives a positive-going pulse $\overline{T1}$. A data input terminal 14 is connected to the second input *e*2 of the non-inverting AND circuit ENI–2. This input can receive a short pulse, or more generally predetermined voltage levels for representing the binary datum "1" or "0," which is to be transferred into and stored in the transfer-storage element.

The gate section 11 utilises, as data transfer gates, two NAND circuits EI–3 and EI–4. The first gate EI–3 can effect the transmission of a binary "1" from the buffer flip-flop 10 to the storage flip-flop 12, since its input *e*1 is connected to the output M of EI–1 and its output E is connected to the input *e*2 of EI–5. The second gate EI–4 can effect the transmission of a binary "0" from the buffer flip-flop 10 to the storage flip-flop 12, since its input *e*1 is connected to the output $\overline{M}$ of OI–1 and its output F is connected to the input *e*2 of EI–6.

An input, for example *e*2, of each of the NAND circuits EI–3 and EI–4 is connected to the terminal 13 to receive the pulses T1. Finally, a last input *e*3 of each of the gates is connected to the input terminal 15. The latter may be connected by a two-position switch 16 either to a terminal 17 or to a terminal 18. The switch 16, which is purely symbolically represented, may obviously be constructed in the form of a high-speed semiconductor switching circuit. It is sufficient for it to be controlled as a function of the mode of operation chosen. For example, when the switch is in the illustrated position, which corresponds to the "single-phase" mode of operation, or to a mode of operation employing one shift pulse per cycle, the signal T2 applied to the terminal 15 is a positive voltage level (+V). When the "two-phase" mode of operation, or mode of operation employing two shift pulses per cycle, is employed, i.e. the terminals 15 and 18 are connected, the signal T2 is a train of positive-going pulses, which are emitted with the same frequency as the pulses T1, but which are shifted in time relation to the latter pulses, in the well known manner.

Means are provided for unconditionally bringing the buffer flip-flop 10 and the storage flip-flop 12 into either of their possible states. Thus, the terminal 19 is connected to the input *e*1 of the non-inverting AND circuit ENI–1 and to the input *e*1 of the NAND circuit EI–6. It is sufficient for a negative-going pulse R to be applied to the terminal 19 in order to bring the two flip-flops into the state "0" when they are initially in the state "1."

In addition, the terminal 20 is connected to the input *e*1 of the NAND circuit EI–1 and to the input *e*1 of the NAND circuit of EI–5. It is sufficient for a negative-going pulse S to be applied to the terminal 20 in order to bring the two flip-flops to the state "1" when they are initially in the state "0."

If, in a preferred embodiment, a positive voltage level is adopted for representing the binary datum "1" in the data-representing signals, the fact that a positive level is applied to the terminal 14, or input D, means that a "1" must be transferred into and stored in the transfer-storage stage under consideration. If the input D receives a negative level, it is an "0" which must be transferred into the said stage and stored therein. A positive voltage level at the outputs M and Q, and a negative voltage level at the outputs $\overline{M}$ and $\overline{Q}$ indicate that the logical content of the stage is a "1," while voltage levels opposite to the preceding ones at these same outputs indicate that the content of the state is an "0."

It is to be observed that the designations of the logical circuits which have been given in the foregoing are applicable on the assumption that the positive level has been chosen to represent the binary "1." It is known that if an inverse convention is adopted (negative level representing the "1"), it is to be considered that the same logical circuit performs, without any modification, an opposite logical function, i.e. that an AND circuit must be regarded as an OR circuit, and vice versa. In addition, what has been stated regarding the voltage levels must not be regarded as being too absolute, since it is known that it often happens that the "negative" level can be very close to the zero potential of earth, and even slightly positive, for example in the case of circuits comprising transistors of the NPN type.

Figure 2:
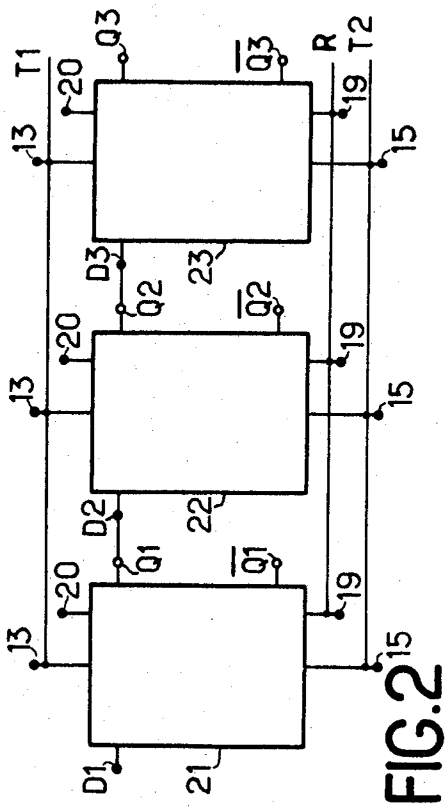
FIG. 2 shows a basic diagram of the assembly of a number of transfer-storage stages for forming a shift register.

It may be seen from FIG. 2 how a number of transfer-storage stages may be incorporated in a shift register. Only the first three stages 21, 22 and 23 have been shown. It may be seen that the output Q1 is connected to the input D2, the output Q2 being connected to the input D3, and so on. All the inputs 13 for the first shift pulses T1 are connected together. All the inputs 15, for receiving the signals T2, where necessary, are connected together. All the inputs 19 for the return-to-zero pulses R are connected together.

In the case of the sequential introduction of the data, it is the input terminal D1 of the first stage 21 which constitutes the only data input terminal of the shift register. The terminals 20, for the "forcing to 1" pulses S, have not been connected together, so as to indicate another possibility of introducing the data, this time in parallel, into the shift register after the latter has been completely reset to zero. It is recalled that a shift register may also be employed as a pulse counter having inputs in parallel. In this case, a "1" is previously stored in the first stage and the shift pulses, which become the counting pulses, are thereafter applied.

Figure 3:
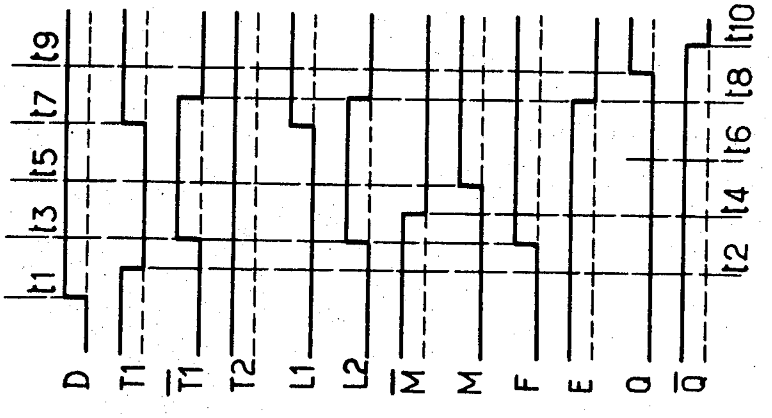
FIG. 3 shows the wave forms available at particular points of the stage in an example of the mode of operation with a singe shift pulse per cycle.

The operation of the transfer-storage stage will now be considered with reference to FIGS. 1 and 3, in the case of the normal operation which has the object of transferring a binary datum, stored in a stage of order $N-1$, to the neighboring stage of order N, illustrated in FIG. 1. FIG. 3 corresponds to the so-called "single-phase" mode of operation, that is to say, that in which only one shift pulse is employed per elementary cycle. In this figure, the interval of time between two consecutive instants, for example *t*2 and *t*3, represents the transit time peculiar to any one of the logical inverting circuits. This transit time is merely the time lag between the change of level applied to an input and the resultant change of level which appears at the output. For example, for very rapid circuits, this transit time may be 5 or even 2 nanoseconds. Moreover, it may be assumed in the present case that the transit time peculiar to the logical circuits ENI–1 and ENI–2 is negligible or nil.

Throughout this operation, the terminals 19 and 20 are maintained at the positive level. This is why the corresponding signals R and S are not indicated in FIG. 3. It is sufficient to recall that this positive level is continuously applied to the inputs *e1* of the logical circuits ENI–1 and EI–6 on the one hand, and EI–1, EI–5 on the other hand. In addition, when the switch 16 is in the illustrated position, the terminal 15 receives a positive voltage level, as signal T2, which tends to render conductive the gates EI–3 and EI–4.

If the stage N–1 initially stores a "1," the level D is positive, normally at least from the instant *t*1. If the stage N initially stores an "0," positive levels are found at the outputs $\overline{M}$, E and $\overline{Q}$, and negative levels at the outputs L1, L2, M, F and Q. The negative-going edge of the shift pulse T1 occurs at the instant *t*2. This pulse ensures that the gates are rendered non-conductive and especially that gate EI–4, because the input *e*2 of the latter is negative and its output F therefore becomes positive at the instant *t*3.

On the other hand, the effective utilisation of the input D results from the following facts. As a result of the positive-going edge of the pulse $\overline{T1}$, at the instant *t*3, the output L2 of ENI–2 immediately becomes positive, with the result that the output $\overline{M}$ of the NOR circuit OI–1 changes from positive to negative at the instant *t*4. The change of the buffer flip-flop 10 to the state "1" is completed by the change of the output M from negative to positive at the instant *t*5. At the end of the signal T1, i.e. at the instant *t*7, the return of the positive level of the inputs *e*2 of the gates EI–3 and EI–4 results in the gate EI–3 becoming effectively conductive. Owing to the fact that the output E becomes negative at the instant *t*8, the transfer of the datum "1" into the storage flip-flop 12 is brought about by the changes of level of opposite senses of the outputs Q and $\overline{Q}$, at the instants *t*9 and *t*10 respectively.

It is to be noted that during this time, i.e. starting from the instant *t*8, at which the signal $\overline{T1}$ ends, the signal at the input D is no longer validated, so that, from the instant *t*9, the level of the input D may be reversed if necessary without any resultant influence on the state of the flip-flop 10.

The operation may be succinctly examined in the case of the transfer of the datum "0" initially stored by the stage $N-1$ to the stage N, which initially stores at "1." At the beginning, the positive level is found at the outputs L1, M, F and Q, and the negative level at the input D and at the outputs L2, $\overline{M}$, E and $\overline{Q}$. It is now the shift pulse T1, which is negative from the instant *t*2, that has the effect of reversing the state of the buffer flip-flop 10 through the output L1. The outputs $\overline{M}$ and M of the said buffer flip-flop change respectively to the positive level and to the negative level at the instants *t*3 and *t*4 respectively. Thereafter, it is the gate EI–4, whose output F becomes negative at the instant *t*8, that produces the transfer of the "0" into the storage flip-flop 12, of which the outputs $\overline{Q}$ and Q change respectively to positive and to negative at the instants *t*9 and *t*10 respectively.

It appears to be unnecessary to recall that the state of the stage N is not lastingly modified by the shift pulse T1 when it is initially in the same state as the stage $N-1$.

There may rapidly be considered what happens in the operation by which the stage N is returned to zero, if the latter stores a "1." For this operation, not only do the shift pulses T2 not exist (terminal 15 at +V), but the shift pulses T1 are also suppressed. Therefore, the input terminal 13 is maintained at the positive level. The same is the case with the terminal 20 (S). On the other hand, it is immaterial whether the terminal 14 (D) receives a positive level or a negative level.

If the level of R changes from positive to negative at an instant *t*1, it will be appreciated that the outputs $\overline{M}$ and $\overline{Q}$ will change from negative to positive at a following instant *t*2. At the next instant *t*3, the outputs M and F change from positive to negative under the influence of the output $\overline{M}$. At the succeeding instant *t*4, the output E changes from negative to positive, which enables the output Q to become negative at the following instant *t*5. It is to be noted that the minimum duration of the pulse R is twice the transit time.

When the "force to 1" signal S is utilised for storing a "1" in a stage of order N, the signals T1, T2 and R are absent. It is obvious that a change of state will occur only if the stage N initially contains an "0." In this case, the operation is similar to that indicated above, except that the changes of level occur in the opposite orders to the preceding ones, in regard to the outputs M, $\overline{M}$ on the one hand and Q, $\overline{Q}$ on the other hand.

In order to examine the "two-phase" or two shift pulse per cycle mode of operation, reference will be made to FIGS. 1 and 4, once again in the case of the normal operation previously indicated. The conditions on which FIG. 4 is based are the same as those indicated for FIG. 3, except that they correspond to the "two-phase" mode.

Here again, the signals S and R do not exist and the inputs *e*1 of the logical circuits EI–1, EI–5 and ENI–1, EI–6 are constantly maintained at the positive level. It is to be noted that, in the absence of the second shift pulse T2 at the input terminal 15, which is now connected to the terminal 18, the negative level, applied to the input *e*3 of the gates EI–3 and EI–4, is sufficient to render the latter non-conductive.

Figure 4:
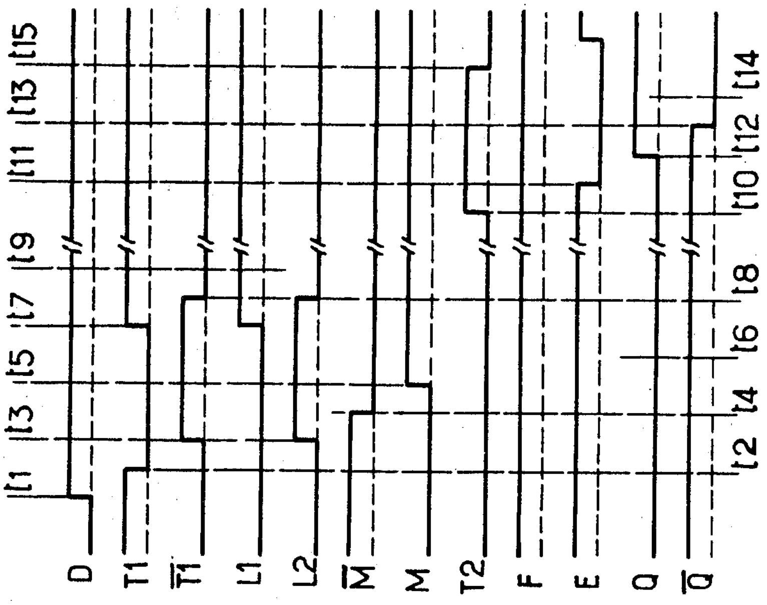
FIG. 4 shows the valve forms available at particular points of the stage in an example of the mode of operation with two shift pulses per cycle.

FIG. 4 corresponds to the case where the stage $N-1$ initially stores a "1" and in which the stage N initially stores an "0." Therefore, it will be assumed that the input 14 (D) receives a positive level at least from the instant *t*1. On comparing FIGS. 3 and 4, it will be seen that the operation is similar to that of the preceding case in regard to the buffer flip-flop 10, i.e. the outputs L1, L2, M and $\overline{M}$, at least until the instant *t*8. Therefore, the transfer of "1" into the buffer flip-flop is effected in exactly the the same way as in the preceding case.

A certain time elapses between the end of the signal $\overline{T1}$, at the instant *t*8, and the beginning of the signal T2, at *t*10. From this instant, the three inputs of the gate EI–3 receive a positive level, which renders this gate conductive. Its output E therefore changes from positive to negative at the instant *t*11. The transfer of the datum "1" into the storage flip-flop 12 is thereafter brought about by the changes of level of opposite directions at the outputs Q and $\overline{Q}$, which take place at the instants *t*12 and *t*13 respectively. The end of the signal T2, at *t*15, is followed by the gate EI–3 again becoming non-conductive.

It will be apparent that the "two-phase" mode of operation must generally be chosen when a shift pulse, for example T1, is likely to arrive at the inputs of the many stages of a shift register at slightly different instants, or in other words with an excessive dispersion in time. This effect is generally due either to different transit times of the intermediate amplifiers, or to external connections of different lengths.

It is therefore necessary to take account of these considerations when determining the time intervals which must elapse in this case between the shift pulses T1 and T2. Moreover, the total duration of an operating cycle depends upon the width of these pulses and upon the length of these intervals. On the other hand, when a circuit arrangement comprises only a very small number of transfer-storage stages, and even only one stage, the above contingencies have no longer to be considered, and a pulse T2 may immediately succeed a pulse T1, that is to say, the time intervals between these pulses may be nil.

The operation of the transfer-storage stage in the case of the transfer of an "0" may readily be deduced from what has been stated in the foregoing.

When the forcing of a stage is to take place, either to "0" or to "1," the signals T1 and T2 must be suppressed. This means that the terminal 13 (T1) is maintained at the positive level, but that the terminal 15 (T2) is maintained at the negative level, which ensures that the gates EI–3 and EI–4 are continuously non-conductive (outputs E and F at the positive level).

During the operation for bringing the stage N to "0," the terminal 20 (S) is maintained at the positive level. If the level at the terminal 19 (R) changes from positive to negative at an instant *t*1, it will be appreciated that the outputs $\overline{M}$ and $\overline{Q}$ change from negative to positive at the next instant *t*2. It is also clear that the outputs M and Q change from positive to negative at a succeeding instant *t*3, thus completing the change of the stage to "0." It is to be noted that in an arrangement operating in accordance with the "two-phase" mode of operation, the minimum width of a pulse R is also equal to double the transit time.

When a stage is to be "forced" to the state "1," under the influence of a pulse S, the previous conditions are the same as above, except that it is now the terminal 19 (R) which is maintained at the positive level. The operation is similar to the preceding one except that the changes of level occur in the opposite orders to the preceding ones, in regards to the outputs M, $\overline{M}$ on the one hand and Q, $\overline{Q}$ on the other hand.

Figure 5:
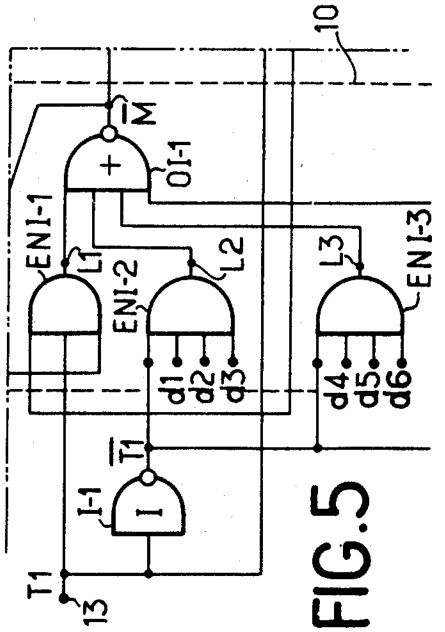
FIG. 5 is a logical diagram of the modified part of a transfer-storage stage in which the buffer flip-flop is subjected to multiple logical input conditions.

FIG. 5 illustrates a modification of the buffer flip-flop 10 of a transfer-storage stage, the object of which is to subject the introduction of a binary datum to a plurality of logical conditions. The inverting circuit I–1 and the non-inverting AND circuit ENI–1 do not undergo any modifications. The AND circuit ENI–2 now has more than two inputs. One or more other non-inverting AND circuits are added, such as that illustrated at ENI–3. Each of these logical circuits ENI–2, ENI–3, etc., has one input connected to receive the positive pulses $\overline{T1}$. The other inputs, such as *d*1–*d*3, *d*4–*d*6, which are not limited to the number shown, are provided for connection to control elements capable of supplying the required logical conditions. The NOR circuit OI–1 has a number of inputs sufficient to correspond to the number of AND circuits provided, such as ENI–1, ENI–2, etc. These modifications do not bring about any changes in the operation of the transfer-storage stage.

With regard to the production in the form of integrated modules, some models of the latter may make it possible, by taking account of the number of their access terminals, to incorporate two stages according to FIG. 1 into a single integrated module. On the other hand, owing to a higher number of logical circuits, it could be necessary to include only one stage modified in accordance with FIG. 5 in an integrated module of the same type.

It will readily be appreciated that the transfer-storage stage according to the invention is entirely universal, notably from the following aspects:

(1) Any microelectronic technique may be employed in the production of these logical circuits, namely: resistance-transistor (RTL), diode-transistor (DTL), two-layer transistor or multi-emitter transistor (TTL), current switching (CML), etc., techniques.

(2) The same integrated module may be incorporated into a circuit arrangement operating in accordance with the "single-phase" mode (a single shift or clock pulse) or in accordance with the "two-phase" mode (two shift or clock pulses per cycle).

(3) The said circuit arrangement may be of the synchronous or asynchronous type. This means that the control pulses (clock, shift and counting pulses) may succeed one another at a regular or irregular rate, depending upon the applications, the only restriction being the minimum duration of an operating cycle.

(4) The transfer-storage stage may also serve to form a pulse counter of the "series" or binary-progression type, simply by connecting in cascade a number of stages in which the output $\overline{Q}$ is connected to the input D of the same stage and suppressing the shift pulses T2.

The transfer-storage stage makes it possible to effect economies in space and equipment in the connecting wiring by reason of the fact that it comprises only one binary datum input. Its operating reliability is excellent by reason of the fact that it is sensitive to the voltage levels rather than to the leading edges of the signals, which edges may be relatively long. Finally, owing to the fact that each of its logical circuits comprises at least one transistor, its operation is not disturbed in the event of a control signal having an excess level of a polarity opposite to the normal polarity of this signal.

I claim:

1. A signal transfer and storage circuit arrangement of the type including a transfer flip-flop and a storage flip-flop, each comprising at least first and second cross-coupled logical circuits with corresponding first and second outputs, this arrangement further comprising:

a gate section composed of a first and a second logical circuits, each having at least three inputs and one output, connecting means for inserting the first logical circuit of said gate section between the first output of said transfer flip-flop and one input of the first logical circuit of said storage flip-flop and for inserting the second logical circuit of said gate section between the second output of said transfer flip-flop and one input of the second logical circuit of said storage flip-flop, one source of first shift pulses of a first polarity connected to an input of said transfer flip-flop and to a second input of each of the first and second logical circuits of said gate section, another source of second shift pulses of an opposite polarity and switching means set to apply the latter pulses to a third input of each of the first and second logical circuits of said gate section, the arrangement being such that the conduction state of said transfer flip-flop can be transmitted to said storage flip-flop in a two pulse per cycle mode of operation, as a result of a pair of time staggered first and second of said shift pulses.

2. A circuit arrangement as claimed in claim 1, wherein a first logical circuit of said transfer flip-flop, of the first and second logical circuits of said gate section and of said storage flip-flop each include a transistor amplifier and perform the AND-INVERT logical function.

3. A circuit arrangement as claimed in claim 2, wherein said switching means is set to apply a constant voltage of said opposite polarity on a third input of each of the logical circuits of said gate section, whereby the conduction state of said transfer flip-flop can be transmitted to said storage flip-flop in a single-pulse per cycle mode of operation.

4. A circuit arrangement as claimed in claim 3, wherein said transfer flip-flop (10) comprises, besides said first logical circuit (EI–1):

a second and a third logical circuits (EN–1, EN1–2) each performing the AND logical function, and a fourth logical circuit (OI–1) performing the OR–INVERT logical function, connecting means to connect respective outputs of said second and third logical circuits to inputs of said fourth logical circuit, the output of the latter to a second input of said first logical circuit (EI–1) and the output of the latter to a third input of said second logical circuit (ENI–1), the second input (*e*2) of the latter receiving said first shift pulse, inverting means (I1) connected to said one pulse source for applying a pulse of inverted polarity to a second input of said third logical circuit (ENI–2) and a control terminal (14) connected to a second input of said third logical circuit and receiving a control signal (D) which determines the entry of a binary value into said transfer flip-flop depending on the actual conduction of the latter upon occurrence of one of said first shift pulses.

5. A circuit arrangement as claimed in claim 4, wherein a further input (e1) of each of the first logical circuits of said transfer and storage flip-flops is connected to receive a set pulse of said first polarity for setting both flip-flops in a predetermined state of conduction.

6. A circuit arrangement as claimed in claim 5, wherein a further input of each of the second logical circuits of said transfer and storage flip-flops is connected to receive a reset pulse of said first polarity for setting both flip-flops in another predetermined state of conduction.

References Cited

UNITED STATES PATENTS

| | | | |
|---|---|---|---|
| 2,971,100 | 2/1961 | Hurst et al. | 307—221 |
| 3,030,581 | 4/1962 | Johnson | 328—37 X |
| 3,127,525 | 3/1964 | Rabinovici | 307—221 |
| 3,258,697 | 6/1966 | Heymann | 328—37 |
| 3,268,740 | 8/1966 | Rywak | 307—221 X |

JOHN S. HEYMAN, Primary Examiner

U S. Cl. X.R.

328—50, 51; 307—215, 221, 224, 238